April 15, 1958  W. W. PAYNE  2,830,544
HYDRAULIC TORQUE CONVERSION DEVICE
Filed June 24, 1955  2 Sheets-Sheet 1

INVENTOR.
WOODROW W. PAYNE
BY
McMorrow, Berman & Davidson
ATTORNEYS

April 15, 1958     W. W. PAYNE     2,830,544
HYDRAULIC TORQUE CONVERSION DEVICE
Filed June 24, 1955     2 Sheets-Sheet 2
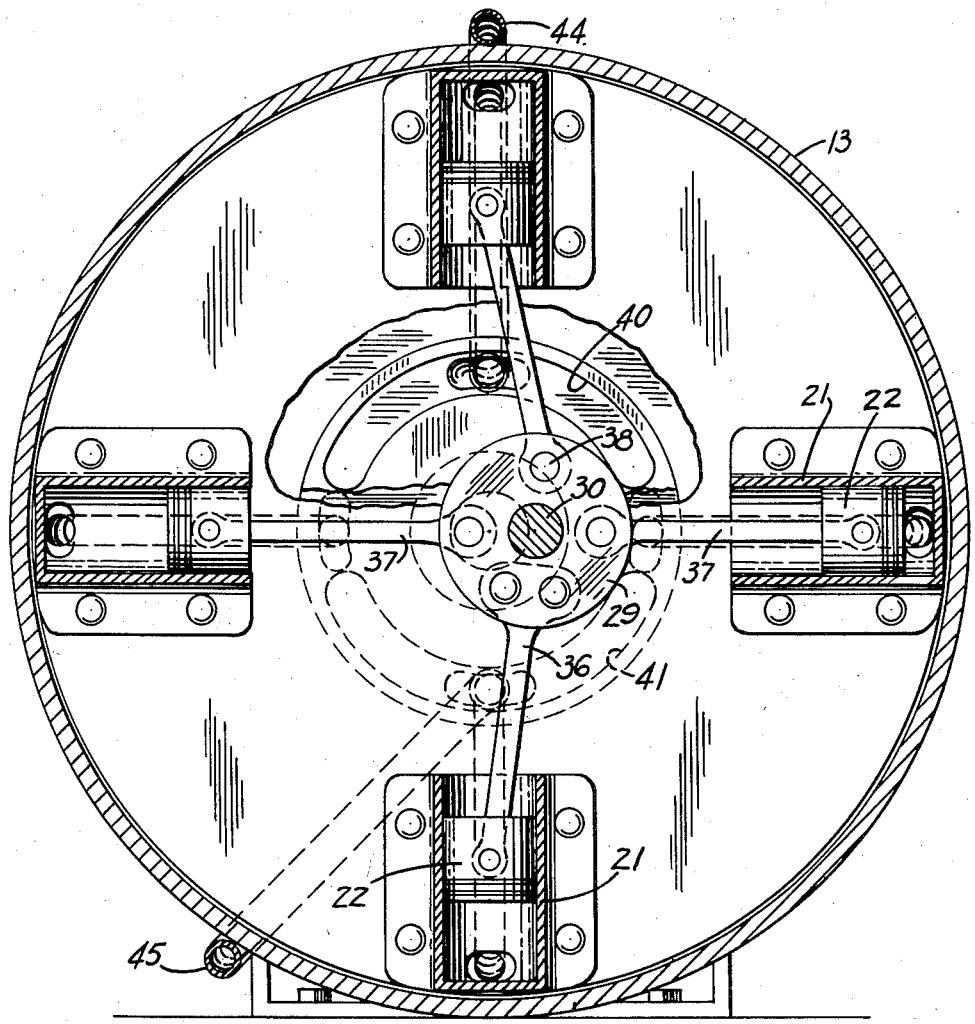
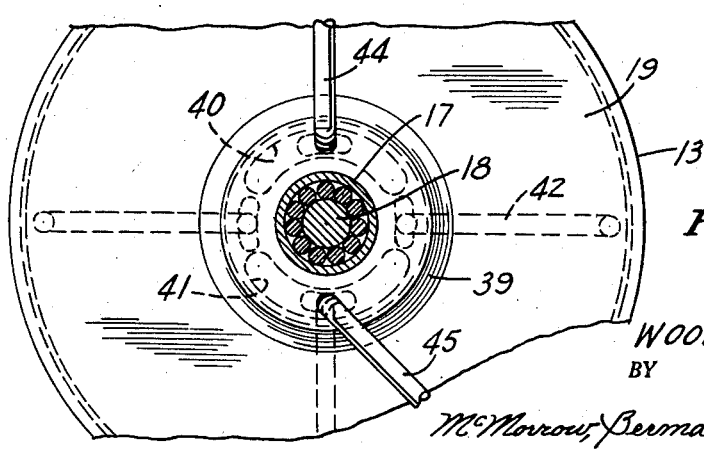
FIG. 3
FIG. 4
INVENTOR.
WOODROW W. PAYNE
BY
ATTORNEYS

United States Patent Office 2,830,544
Patented Apr. 15, 1958

2,830,544

HYDRAULIC TORQUE CONVERSION DEVICE

Woodrow W. Payne, Bayfield, Colo.

Application June 24, 1955, Serial No. 517,714

2 Claims. (Cl. 103—161)

This invention relates to power transmissions, and more particularly to an improved power transmission of the hydraulic type.

A main object of the invention is to provide a novel and improved hydraulic torque conversion device which is simple in construction, which is reliable in operation, and which is provided with means for readily adjusting the device to provide a desired torque transmission ratio therethrough.

A further object of the invention is to provide an improved hydraulic torque conversion device which involves relatively inexpensive components, which is durable in construction, which involves relatively few parts, and which is provided with readily accessible and easily operated means for varying the transmission ratio therethrough.

Further objects and advantages of the invention will become apparent from the following description and claims, and from the accompanying drawings, wherein:

Figure 3 is an enlarged transverse vertical cross sectional view taken on the line 3—3 of Figure 1.

Figure 4 is a cross sectional detail view taken on the line 4—4 of Figure 1.

Figure 1:
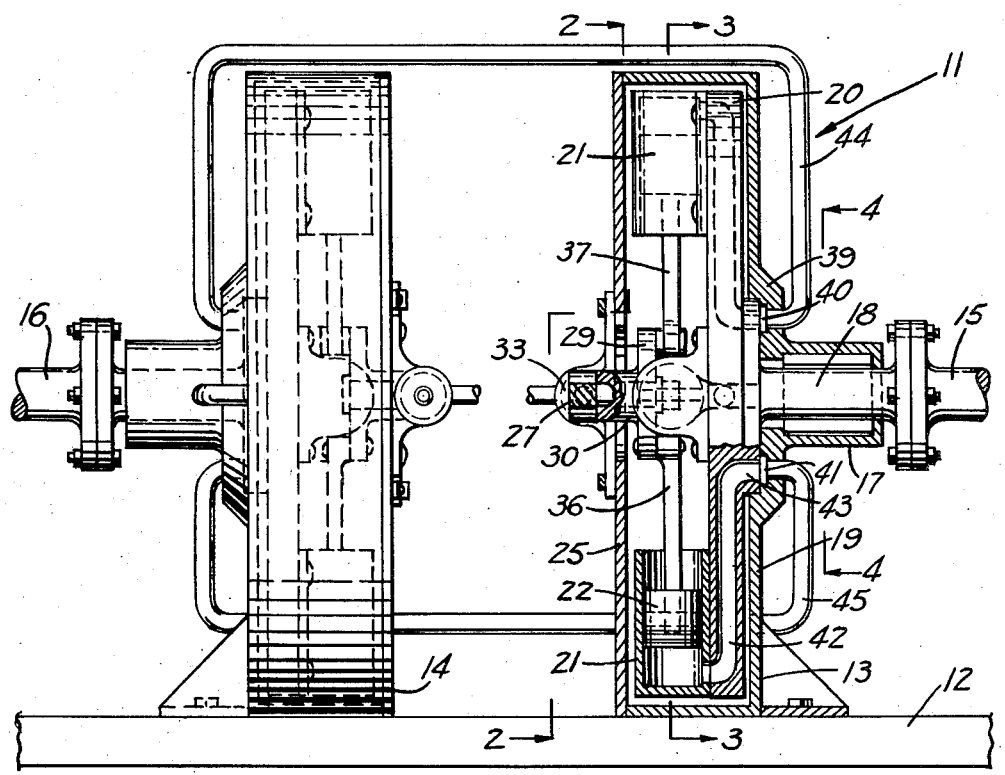
Figure 1 is a side elevational view, partly in vertical cross section, of an improved hydraulic torque conversion device constructed in accordance with the present invention.

Referring to the drawings, 11 generally designates an improved hydraulic torque conversion device according to the present invention, the device 11 comprising a suitable support 12 on which are mounted the respective vertical, substantially circular housings 13 and 14 which are disposed in parallel, substantially coaxial relationship, as illustrated herein, but which are not necessarily arranged coaxially, since the housings 13 and 14 are mechanically separate.

Designated at 15 is the power input shaft and designated at 16 is the power output shaft of the torque conversion device. Mounted in each of the housings 13 and 14 is a pump device, said devices being of similar construction, the pump device in the housing 13 being employed to develop hydraulic pressure and the device of the housing 14 being employed as a motor responding to the hydraulic pressure developed by the pump device in the housing 13 to drive the power output shaft 16. Since the pump device in the housing 13 is the same in construction as the motor device in the housing 14 only the pump device in the housing 13 will be described in detail.

The housing 13 is provided with the axial bearing sleeve 17 projecting axially from the end wall of the housing.

Rotatably journaled in the bearing sleeve 17 is the shaft 18 which is coupled to the power input shaft 15 in any suitable manner. Secured to the inner end of the shaft 18 adjacent the end wall 19 of housing 13 is the disc member 20, and secured on the disc member 20 in a common transverse plane perpendicular to the axis of shaft 18 are four equally spaced radial cylinders 21.

Figure 2:
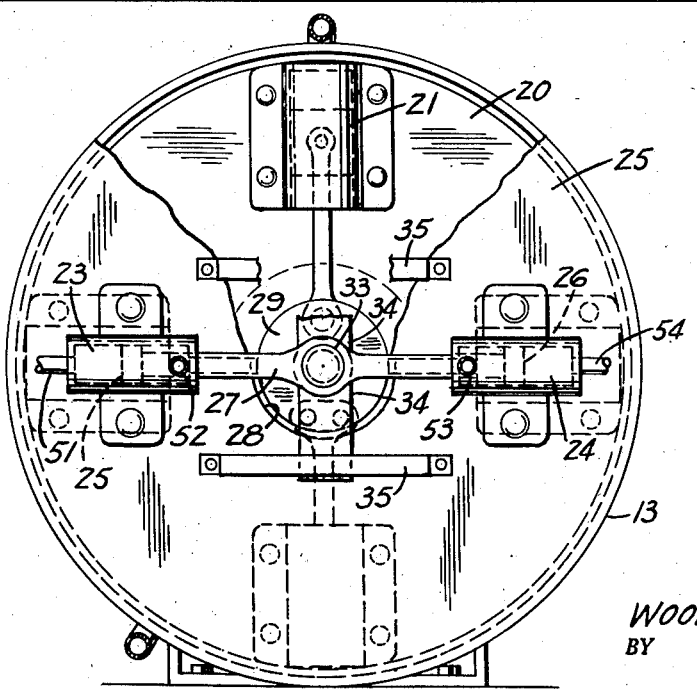
Figure 2 is an elevational view comprising a transverse vertical cross sectional view taken partly on the line 2—2 of Figure 1.

As shown in Figure 2, the cylinders 21 are secured at the peripheral portions of the disc member 20 and are closed at their outer ends. Slidably mounted in each cylinder 21 is a piston 22.

Designated at 23 and 24 are respective hydraulic cylinders which are secured on the circular inner wall 25 of the housing 13 in diametrically opposing relationship, said cylinders 23 and 24 containing respective pistons 26 and 26' which are rigidly connected together by a connecting rod 27 extending diametrically over a circular central aperture 28 formed in the wall 25. Designated at 29 is a circular bearing member which is mounted inside the housing 13 parallel to the walls 19 and 25 thereof, the bearing member 29 being provided with a central stud portion 30 which projects through the aperture 28 and which is pivotally connected to the intermediate portion of the connecting rod 27 at 33.

The stud member 30 is integrally formed with a pair of arms 34, 34 extending substantially perpendicularly to the connecting rod 27 externally adjacent the wall 25, one of the arms 34 extending upwardly and the other of the arms 34 extending downwardly, as is clearly shown in Figures 1 and 2. The arms 34 extend slidably between respective horizontal restraining straps 35, 35, secured to wall 25, and the outer surface of said wall, said straps being offset from the wall 25 by a distance slightly greater than the thickness of the arms 34, 34, so that said arms are readily slidable between the straps and the outer surface of wall 25.

The straps 35 are preferably fabricated from any suitable rigid material and are of sufficient thickness to retain the arms 34, 34 and to guide the bearing member 29 in a plane parallel to the plane of the wall 25.

Rigidly connected to the bearing member 29 and projecting radially therefrom is a first connecting rod 36 which is pivotally connected to the piston 22 of the lowermost cylinder 21, as shown in Figure 3. The pistons in the remaining cylinders 21 are connected to the bearing member 29 by respective link bars 37, the link bars being pivotally connected to the pistons and being pivotally connected to the bearing member 29, as by pivot pins 38. The connecting rods 36 and 37 are all coplanar with each other and with the cylinders 21.

The wall 19 is centrally formed with the thickened portion 39 extending around the sleeve element 17 thereof, said thickened portion being interiorly formed with the respective arcuate grooves 40 and 41, said arcuate grooves being concentric and being arranged in opposing relationship, as shown in Figure 3. The disc member 20 is formed with respective passages 42 connecting the outer closed end portions of the cylinders 21 to respective ports 43 located concentrically with and being registrable with the arcuate grooves 40 and 41. Thus, when the passage 42 of the upper cylinder 21 registers with the arcuate groove 40, the port 43 of the diametrically opposite passage 42, associated with the lowermost cylinder 21 registers with the arcuate groove 41.

The arcuate grooves 40 and 41 are of sufficient length so that two cylinders 21 may be in communication with groove 40 while the two opposite cylinders are simultaneously in communication with the groove 41.

Connected to the thickened intermediate portion 39 of wall 19 and communicating with the intermediate portion of the arcuate groove 40 is a fluid outlet conduit 44, and similarly connected to the wall portion 39 and communicating with the groove 41 at the intermediate portion thereof is a fluid inlet conduit 45.

It will be readily apparent that the functions of the conduits 44 and 45 may be reversed by reversing the position of the bearing member 29 to move it to an opposite location with respect to the axis of the shaft 18. Thus the structure and housing 13 may be employed to transmit either forward or reverse torque depending upon the adjusted position of the bearing member 29 with respect to the axis of shaft 18, namely depending upon whether the bearing member 29 is on one side or on the other side of said axis.

With the bearing member 29 adjusted so that the conduit element 44 is the outlet and the conduit element 45 is the inlet, the pistons in the cylinders communicating with the groove 40 move in an outward direction while the pistons in the cylinders communicating with the groove 41 move inwardly, whereby suction is developed in the cylinders communicating with the groove 41 while at the same time compression occurs in the cylinders communicating with the groove 40. This provides fluid pressure in the outlet conduit 44 and at the same time provides suction in the inlet conduit 45, whereby fluid may circulate through the pump.

The position of the connection rod 27 is controlled by the hydraulic cylinders 23 and 24. Thus the cylinder 23 has the conduit 51 and 52 communicating with the opposite ends thereof and the cylinder 24 has the conduits 53 and 54 communicating with the opposite ends thereof. When hydraulic fluid under pressure is admitted into the conduits 52 and 54, while the conduits 51 and 53 are connected to allow fluid to exhaust from the cylinders 23 and 24, the connecting rod 27 then moves to the left, as viewed in Figure 2. This moves the bearing member 29 to the left. Conversely, when fluid under pressure is admitted into the conduits 51 and 53 and the conduits 52 and 54 are allowed to exhaust, the connecting rod 27 is moved to the right in Figure 2, moving the bearing member 29 to the right.

*Operation*

The shaft 15 is caused to rotate by an external source of power, resulting in the rotation of the disc member 20 and the attached cylinders 21 within the housing 13. While the shaft 15 is rotated hydraulic fluid under pressure, from a source not shown, is introduced in the cylinders 23 and 24 on one side of the respective pistons 25 and 26 by means of the conduits 51 and 53, resulting in simultaneous movement of the pistons 25 and 26 in one direction and shifting of the bearing member 29 in the same direction. With this movement of the pistons 25 and 26 and this shifting of the bearing member 29, the pistons 22 reciprocate in turn in their associated cylinders 21 as the disc member 20 is rotated with the shaft 15. The reciprocation of each piston 22 acts in turn to draw the hydraulic fluid from the groove 40 in the housing 13 through the ports 43, through the passage 42, into the associated cylinder 21, while the disc member only executes a half revolution, and as the disc member 20 executes the other half revolution each piston 22 in turn forces the hydraulic fluid from the associated cylinder 21 through the passage 42, into the port 43, and then into the groove 41 in the housing 13, from which groove 41 the hydraulic fluid is forced through the conduit 45 into the housing 14. The hydraulic fluid admitted through the conduit 45 then actuates like pistons in associated cylinders and effects the rotation of the power output shaft 16, the fluid returning through conduit 44 to the grooves 40 in the housing 13 for re-use. Thus, it will be seen that shifting of the bearing members 29 in the housing 13 and in the housing 14 will provide torque varying from zero to the maximum when the shaft 15 is driven by an external source of power.

The motor device contained in the housing 14 is the same in construction as the pump device contained in the housing 13. Thus, the motor device in housing 14 has an inlet conduit element which comprises the outlet conduit 44 of the pump device 13, and the motor device 14 has an outlet conduit element which comprises the inlet conduit element 45 of pump device 13. The motor device 14 is provided with similar fluid pressure cylinder operated means for controlling the position of its bearing member 29, whereby the respective bearing members 29 of the pump and motor devices may be independently adjusted, and whereby the resultant torque conversion ratio obtained by the device may be adjusted over a wide range of values.

While a specific embodiment of an improved hydraulic torque conversion device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a hydraulic torque conversion device, a support, a housing mounted on said support, a shaft extending rotatably through a wall of said housing, a disc member secured to said shaft in said housing, a plurality of radial cylinders on said disc member, respective pistons in said cylinders, a bearing member in said housing, fluid pressure-actuated means operatively coupled to said bearing member, said last-named means comprising a pair of opposed cylinders mounted on said housing parallel to said disc member, respective pistons in said opposed cylinders, a common piston rod connecting said last-named pistons, means connecting the intermediate portion of said common piston rod to said bearing member, respective arms rigidly secured to said piston rod and extending perpendicular thereto on opposite sides thereof, and respective guide straps secured to said housing on opposite sides of said piston rod and overlying said arms, said arms being slidably received between the surface of said housing and said guide straps, whereby said bearing member is guided for adjustment parallel to said disc member, piston rods connecting said pistons to said bearing member, respective opposing arcuate passages in the wall of said housing adjacent said piston member, respective passages in the disc member connecting the outer end portions of the cylinders to said arcuate passages, and respective inlet and outlet fluid conduits connected to said housing wall and communicating with the respective arcuate passages.

2. In a hydraulic torque conversion device, a support, a housing mounted on said support, a shaft extending rotatably through a wall of said housing, a disc member secured to said shaft in said housing, a plurality of radial cylinders on said disc member, respective pistons in said cylinders, a bearing member in said housing, fluid pressure-actuated means operatively coupled to said bearing member, said last-named means comprising a pair of opposed cylinders mounted on said housing parallel to said disc member, respective pistons in said opposed cylinders, a common piston rod connecting said last-named pistons, means connecting the intermediate portion of said common piston rod to said bearing member, respective arms rigidly secured to said piston rod and extending perpendicular thereto on opposite sides thereof, and respective guide straps secured to said housing on opposite sides of said piston rod and overlying said arms, said arms being slidably received between the surface of said housing and said guide straps, whereby said bearing member is guided for adjustment parallel to said disc member, a piston rod rigidly connected to said bearing member and pivotally connected to one of said first-named radial cylinders, respective link members pivotally connected to said bearing member and to the remainder of said radial cylinders, respective opposing arcuate passages in the wall of said housing adjacent said disc member, respective passages in the disc member connecting the outer end portions of the cylinders to said arcuate passages, and respective inlet and outlet fluid conduits connected to said housing wall and communicating with the respective arcuate passages.

References Cited in the file of this patent

UNITED STATES PATENTS

| | | |
|---|---|---|
| 801,097 | Manly | Oct. 3, 1905 |
| 1,152,729 | Hele-Shaw | Sept. 7, 1915 |
| 1,502,310 | Magie et al. | July 22, 1924 |
| 1,658,705 | Caproni | Feb. 7, 1928 |
| 1,778,238 | Wilsey | Oct. 14, 1930 |
| 2,221,501 | Waite | Nov. 12, 1940 |
| 2,406,138 | Ferris et al. | Aug. 20, 1946 |
| 2,502,546 | Adams | Apr. 4, 1950 |
| 2,568,357 | Moulden | Sept. 18, 1951 |